US010627350B2

(12) United States Patent
Dragna et al.

(10) Patent No.: US 10,627,350 B2
(45) Date of Patent: Apr. 21, 2020

(54) COMPOSITIONS, APPARATUS AND METHODS FOR DETERMINING ALKALINITY OF AN ANALYTE SOLUTION

(71) Applicant: WATER LENS, LLC, Houston, TX (US)

(72) Inventors: Justin M. Dragna, Houston, TX (US); Adam Garland, Houston, TX (US); Tyler West, Houston, TX (US)

(73) Assignee: WATER LENS, LLC, Houston, TX (US)

( * ) Notice: Subject to any disclaimer, the term of this patent is extended or adjusted under 35 U.S.C. 154(b) by 255 days.

(21) Appl. No.: 15/524,107

(22) PCT Filed: Nov. 5, 2015

(86) PCT No.: PCT/US2015/059152
§ 371 (c)(1),
(2) Date: Aug. 18, 2017

(87) PCT Pub. No.: WO2016/073670
PCT Pub. Date: May 12, 2016

(65) Prior Publication Data
US 2018/0073990 A1    Mar. 15, 2018

Related U.S. Application Data

(60) Provisional application No. 62/076,909, filed on Nov. 7, 2014, provisional application No. 62/084,870, filed on Nov. 26, 2014.

(51) Int. Cl.
G01N 21/80    (2006.01)
G01N 31/22    (2006.01)
(Continued)

(52) U.S. Cl.
CPC ............ *G01N 21/80* (2013.01); *B01L 3/5085* (2013.01); *G01N 21/253* (2013.01); *G01N 31/22* (2013.01);
(Continued)

(58) Field of Classification Search
CPC .... G01N 21/80; G01N 31/221; G01N 21/253; G01N 31/22; B01L 3/5085;
(Continued)

(56) References Cited

U.S. PATENT DOCUMENTS 3,950,137 A   4/1976   Larson et al. ................ 422/81
8,148,166 B2  4/2012   Chen et al. ................... 436/163
(Continued)

FOREIGN PATENT DOCUMENTS

CN   101200755   6/1918
CN   1057484     1/1992
(Continued)

OTHER PUBLICATIONS

International Preliminary Report on Patentability in PCT application No. PCT/US2015/059152, dated Feb. 22, 2016.
(Continued)

*Primary Examiner* — Lore R Jarrett
(74) *Attorney, Agent, or Firm* — Norton Rose Fulbright US LLP

(57) ABSTRACT

Compositions, kits and methods of using the kits and compositions to determine the alkalinity of an analyte solution are described. The kit can include a lyophilized titrant.

7 Claims, 4 Drawing Sheets

(51) Int. Cl.
*G01N 21/25* (2006.01)
*B01L 3/00* (2006.01)

(52) U.S. Cl.
CPC ........ *G01N 31/221* (2013.01); *B01L 2200/16* (2013.01); *B01L 2300/0829* (2013.01)

(58) Field of Classification Search
CPC ......... B01L 2300/0829; B01L 2200/16; A61K 31/325; A61K 31/44; A61K 31/40; A61K 31/27

See application file for complete search history.

(56) References Cited

U.S. PATENT DOCUMENTS

| | | | |
|---|---|---|---|
| 2005/0126909 A1* | 6/2005 | Weiller | G01N 27/126 204/418 |
| 2007/0092975 A1* | 4/2007 | Potyrailo | B01L 3/502715 436/169 |
| 2011/0015599 A1 | 1/2011 | Song et al. | |
| 2012/0328485 A1 | 12/2012 | Song et al. | |

FOREIGN PATENT DOCUMENTS

| | | |
|---|---|---|
| CN | 1281144 | 1/2001 |
| CN | 101297197 | 10/2008 |
| CN | 101675331 | 3/2010 |
| CN | 102007406 | 4/2011 |
| CN | 102470065 | 5/2012 |
| CN | 104062247 | 9/2014 |
| JP | H08313444 | 11/1996 |
| JP | 2014025924 | 2/2014 |
| KR | 1020090044136 | 5/2009 |
| WO | WO 2007/050463 | 5/2007 |

OTHER PUBLICATIONS

International Search Report and Written Opinion in PCT Application No. PCT/US2015/059152, dated Feb. 22, 2016.
Badugu et al., "A wavelength-ratiometric pH sensitive probe based on the boronic acid moiety and suppressed sugar response," *Dyes and Pigments*, 2004, 61(3):227-234.
Chen et al., "Colorimetric optical pH sensor production using a dual-color system," *Sensors and Actuators B*, 2010, 146(1):278-282.
Extended European Search Report issued in European Patent Application No. 15858042, dated Jul. 4, 2018.
John et al., "pH-Sensing 96-well microtiter plates for the characterization of acid production by dairy starter cultures," *Journal of Dairy Research*, 2003, 70(3):327-333.
Office Action issued in Corresponding Chinese Patent Application No. 201580067847, dated Mar. 18, 2019 (English Translation).
Office Action Issued in Corresponding Chinese Patent Application No. 201580067847.4, dated Dec. 9, 2019. English translation provided.
Zheng, et al., Biochemistry Assay ($2^{nd}$ Edition), China Medical Science Press, pp. 88, 2010.

* cited by examiner

COMPOSITIONS, APPARATUS AND METHODS FOR DETERMINING ALKALINITY OF AN ANALYTE SOLUTION

CROSS REFERENCE TO RELATED APPLICATIONS

This application is a national phase application under 35 U.S.C. § 371 of International Application No. PCT/US2015/059152 filed Nov. 5, 2015, which claims the benefit of U.S. Provisional Application No. 62/076,909, filed Nov. 7, 2014, and U.S. Provisional Application No. 62/084,870, filed Nov. 26, 2014, which are incorporated by reference herein.

BACKGROUND OF THE INVENTION

A. Field of the Invention

The invention generally concerns the determination of alkalinity of a solution. In particular, the kits and methods of the present invention are used to determine the alkalinity of an analyte composition by adding the analyte composition a lyophilized titrant composition in each microwell of the plurality of microwells to form a solution in each microwell having a different pH.

B. Description of Related Art

Alkalinity is the buffering capacity of a solution. Alkalinity is a measure of the ability of water to neutralize acid and bases thereby maintaining a fairly stable pH. Aqueous solutions that include compounds such as bicarbonates, carbonates, and hydroxides which combine with hydronium (H+) ions from the water thereby raising the pH (more basic) of the water. To maintain a fairly constant pH in a water body, a higher alkalinity measurement is desirable. Water bodies with high alkalinity can have the ability to neutralize acidic inputs into the water body. For example, rocks, soil, salts, some plant activities, and industrial wastewater discharge can provide sufficient concentrations of compounds to a water body that increase the alkalinity of the water body. Conventional methods for determining alkalinity include titrating solutions of interest to a pH where all of the titratable base is consumed. The end point of the titration is determined by adding a colorimetric pH indicator, (for example, bromocresol green), and using naked-eye detection of a change in color to determine the endpoint. This technique suffers from many disadvantages. First, the visual technique requires the analyst to manually titrate a solution of acid, drop wise, into the analyte solution of interest. Secondly, the visual technique requires the subjective determination of a color change. These two disadvantages often result in errors resulting from the analyst overshooting the endpoint due to adding too much strong acid or misjudging the color change at the endpoint. Thus, the analyst has to in many cases redo the titration method. Also, manual titration is time-consuming.

SUMMARY OF THE INVENTION

A solution to the disadvantages of a visual titration method has been discovered. In particular, the solution resides in the use of lyophilized titrant samples of various concentrations in a microwell plate. Analyte samples are added to the lyophilized samples and the absorbance of the resulting samples at two different wavelengths is measured and the alkalinity of the analyte composition is determined based on the measured absorbance value. Notably, the present invention eliminates the drawbacks of traditional manual titrations by eliminating the subjective naked-eye determination and provides an accurate value as a user simply has to add the analyte solution or analyte solutions to each microwell in the plate instead of manually titrating each analyte solutions. Furthermore, the present invention removes the subjective naked-eye determination of an endpoint by using a spectrophotometer to determine the endpoint.

In one aspect of the invention, there is disclosed an alkalinity assay kit. The kit includes a) a microwell plate and b) a lyophilized titrant composition comprising an acid, a pH sensitive dye, and an excipient. A plurality of microwells of the microwell plate contain different amounts of the lyophilized titrant composition such that when an analyte composition is added to the lyophilized titrant composition in each microwell of the plurality of microwells a solution forms and the pH of the solution in each microwell is different. The microwell plate can include 6, 24, 96, 384, or 1536 microwells. In some aspects of the invention, the microwell plate includes 6 microwells and each microwell contains sequentially increasing amounts of titrant compositions. In other aspects of the invention, the microwell plate has at least 24 or 96 microwells and at least 10 microwells contain sequentially increasing amounts of the titrant composition. The amounts of lyophilized titrant in the microwells can sequentially increase and the pH of the solution in each microwell is sequentially lower. The plurality of microwells can be sealed to prevent the titrant composition from exiting the plurality of microwells. In some instances, the plurality of microwells are sealed with a plastic film or a foil. The alkalinity assay kit can also include a spectrophotometer capable of measuring wavelengths between 400 and 700 nanometers (nm).

In some instances, the titrant composition can include a pH sensitive dye capable of having a colorimetric response in response to a change in pH of the solution, an acid compound, and an excipient compound. The pH sensitive dye can be any pH sensitive dye. The pH sensitive dye can have a colorimetric response in a particular pH range. In some instances, the pH sensitive dye can have an acid form that has a different absorbance value than an absorbance value of a base form of the pH sensitive dye. Non-limiting examples of pH sensitive dyes include triphenylmethane dyes, bromocresol green, crystal violet, cresol red, thymol blue, 2,4-dintrophenol, bromopheol blue, methyl orange, methyl red, eriochrome black T, and bromocresol purple. In one particular instance, the pH sensitive dye is bromocresol green. The titrant solution can include (2-hydroxylpropyl)-β-cyclodextrin, glycine, citrate, lactose, mannitol, sucrose, polyethylene glycol, or any combination thereof as an excipient. In certain instances, (2-hydroxylpropyl)-β-cyclodextrin is used as an excipient. The acid in the titrant solution can be camphorsulfonic acid, trichloroacetic acid, p-toluene sulfonic acid, 2-(N-morpholino)ethanesulfonic acid, taurine, or any combination thereof, with a preferred acid being camphorsulfonic acid. The composition can be a powder. The powder can be made by providing an aqueous solution of the titrant composition to one or more containers and subjecting at least one of the containers to lyophilizing conditions sufficient to remove the water from the aqueous solution to form the powder. In some instances, the one or more containers are microwells of a microwell plate. The powder can be packaged (for example, a bag, vial, or encapsulated). The powder can be sold separately from the kit.

The alkalinity assay kit of the present invention can be used to determine the alkalinity of an analyte composition or a plurality of analyte compositions. The method can include a) obtaining any one of the alkalinity assay kits described throughout this Specification; b) obtaining an analyte composition; c) adding substantially the same volume of the analyte composition to each of the plurality of microwells of the microwell plate to form solutions from the analyte composition and the lyophilized titrate compositions in each of the plurality of microwells, wherein the pH of the solution in each microwell is different; d) measuring the absorbance value for each solution in each of the plurality of microwells at a first wavelength and a second wavelength and determining the alkalinity of the analyte composition based on the measured absorbance values. At least one of the solutions in the microwells has absorbance values as measured at one or more wavelengths that are not statistically differentiable from the absorbance values of a solution with a pH value below that at which the dye shows a colorimetric response, which may be expressed as a ratio of the absorbance of multiple wavelengths, thereby indicating that said solution has an amount of acid that is greater than the amount required to neutralize the alkalinity of the analyte composition and at least one of the solutions in the microwells has absorbance values as measured at one or more wavelengths that are statistically differentiable from the absorbance values of a solution with a pH value above that at which the dye shows a colorimetric response, which may be expressed as a ratio of the absorbance of multiple wavelengths, thereby indicating that said solution has an amount of acid that is less than the amount required to neutralize the alkalinity of the analyte composition. In one instance, at least one of the solutions has an absorbance value at the second wavelength that is 0.4 to 1.7 times greater than absorbance value at the first wavelength, and where the at least one solution represents the alkalinity of the analyte composition +/−40 ppm. The analyte can be obtained from a variety of sources such as a subsurface well, a hydrocarbon subsurface, a water well in a subsurface hydrocarbon formation. In some instances, the analyte solution is obtained from a hydrocarbon drilling or fracking process. The alkalinity value of the analyte can correlated to a hardness of the water. In some instances, a plurality of solutions having the same analyte are obtained, and each analyte solution is obtained from a different well of a plurality of subsurface wells.

The alkalinity assay kits described throughout the Specification can be made by a) obtaining a microwell plate; b) obtaining a lyophilized titrant composition comprising an acid, a pH sensitive dye, and an excipient; c) adding sequentially increasing amounts of the lyophilized titrant composition to a plurality of microwells of the microwell plate such that when an analyte composition is added to the lyophilized titrant composition in each microwell of the plurality of microwells a solution forms and the pH of the solution in each microwell is sequentially lower. In some instances, the kit is made by a) adding sequentially increasing amounts of the titrant composition to the plurality of microwells such that when an analyte composition is added to the lyophilized titrant composition in each microwell of the plurality of microwells a solution forms and the pH of the solution in each microwell is sequentially lower and b) lyophilizing the titrant solutions. The plurality of microwells can be sealed with foil or a plastic film to inhibit or prevent the titrant composition from exiting the plurality of microwells. In some embodiments, the titrant composition consists essentially of camphorsulfonic acid, (2-hydroxylpropyl)-β-cyclodextrin, and bromocresol green.

In the context of the present invention 45 embodiments are described. Embodiment 1 is a composition for the determination of an alkalinity concentration of a solution that includes a pH sensitive dye capable of having a colorimetric response in response to a change in pH of the solution, an acid compound, and an excipient compound. Embodiment 2 is the composition of embodiment 1, wherein the pH sensitive dye has an acid form that has a different absorbance value than an absorbance value of a base form of the pH sensitive dye. Embodiment 3 is the composition of any one of embodiments 1 to 2, wherein the pH sensitive dye includes triphenylmethane dyes, bromocresol green, crystal violet, cresol red, thymol blue, 2,4-dintrophenol, bromopheol blue, methyl orange, methyl red, eriochrome black T, bromocresol purple, or any combination thereof. Embodiment 4 is the composition of embodiment 3, wherein the pH sensitive dye is bromocresol green. Embodiment 5 is the composition of any one of embodiments to 4, wherein the acid compound can include camphorsulfonic acid, trichloroacetic acid, p-toluene sulfonic acid, 2-(N-morpholino) ethanesulfonic acid, taurine, or any combination thereof. Embodiment 6 is the composition of embodiment 5, wherein the acid compound is camphorsulfonic acid. Embodiment 7 is the composition of any one of embodiments 1 to 6, wherein the excipient includes (2-hydroxylpropyl)-β-cyclodextrin, glycine, citrate, lactose, mannitol, sucrose, polyethylene glycol, or any combination thereof as an excipient. Embodiment 8 is the composition of embodiment 7, wherein the excipient is (2-hydroxylpropyl)-β-cyclodextrin, preferably, (2-hydroxylpropyl)-β-cyclodextrin. In embodiment 9, the composition of any one of embodiments 1 to 8, wherein the composition consists essentially of bromocresol green, camphorsulfonic acid, and (2-hydroxylpropyl)-β-cyclodextrin. Embodiment 10 is the composition of any one of embodiments to 9, wherein the composition is a powder. Embodiment 11 is the composition of embodiment 10, wherein the powder is made by providing an aqueous solution of the titrant composition to one or more containers and subjecting at least one of the containers to lyophilizing conditions sufficient to remove the water from the aqueous solution to form the powder. Embodiment 12 is the composition of embodiment 11, wherein the one or more containers are microwells of a microwell plate. Embodiment 13 is the composition of embodiment 11, wherein the container is a bag or a vial.

Embodiment 14 describes an alkalinity assay kit. The alkalinity assay kit can include (a) a microwell plate; and (b) a lyophilized titrant composition comprising an acid, a pH sensitive dye, and an excipient, wherein a plurality of microwells of the microwell plate contain different amounts of the lyophilized titrant composition such that when an analyte composition is added to the lyophilized titrant composition in each microwell of the plurality of microwells a solution forms and the pH of the solution in each microwell is different. Embodiment 14 is the alkalinity assay kit of embodiment 14, wherein the microwell plate can include 6, 24, 96, 384, or 1536 microwells. Embodiment 15 is the alkalinity assay kit of embodiment 15, wherein the microwell plate includes 6 microwells and each microwell contains sequentially increasing amounts of the titrant composition. Embodiment 17 is the alkalinity assay kit of embodiment 15, wherein the microwell plate includes 24 microwells or 96 microwells, and at least 10 microwells contain sequentially increasing amounts of the titrant composition. Embodiment 18 is the alkalinity assay kit of any one of embodiments 14 to 17, wherein the amounts of lyophilized titrant sequentially increase and the pH of the solution in each microwell is sequentially lower. Embodiment 19 is the alkalinity assay kit of any one of embodiments 14 to 18, wherein the pH sensitive dye has an acid form and a base form, wherein the absorbance value of the acid form is different from the absorbance value of the base form. Embodiment 20 is the alkalinity assay kit of any one of embodiments 14 to 18, wherein the pH sensitive dye has a colorimetric response in a particular pH range. Embodiment 21 is the alkalinity assay kit of any one of embodiments 19 and 20, wherein the pH sensitive dye is a triphenylmethane dye, bromocresol green, crystal violet, cresol red, thymol blue, 2,4-dintrophenol, bromopheol blue, methyl orange, methyl red, eriochrome black T, bromocresol purple, or any combination thereof. Embodiment 22 is the alkalinity assay kit of embodiment 21, wherein the pH sensitive dye is bromocresol green. Embodiment 23 is the alkalinity assay kit of any one of embodiments 14 to 22, wherein the excipient is (2-hydroxylpropyl)-β-cyclodextrin, glycine, citrate, lactose, mannitol, sucrose, polyethylene glycol, or any combination thereof. Embodiment 24 is the alkalinity assay kit of embodiment 23, wherein the excipient is (2-hydroxylpropyl)-β-cyclodextrin. Embodiment 25 is the alkalinity assay kit of any one of embodiments 14 to 24, wherein the acid is camphorsulfonic acid, trichloroacetic acid, p-toluene sulfonic acid, taurine acid, or any combination thereof. Embodiment 26 is the alkalinity assay kit of embodiment 25, wherein the acidic composition is camphorsulfonic acid. Embodiment 27 is the alkalinity assay kit of any one of embodiments 14 to 26, wherein the plurality of microwells are sealed to prevent the titrant composition from exiting the plurality of microwells. Embodiment 28 is the alkalinity assay kit of embodiment 26, wherein the plurality of microwells are sealed with a plastic film or a foil. Embodiment 29 is the alkalinity assay kit of any one of embodiments 14 to 28, further comprising a spectrophotometer capable of measuring wavelengths between 400 and 700 nanometers.

Embodiment 30 describes a method of determining the alkalinity of an analyte composition. The method can include (a) obtaining any one of the compositions of embodiments 1 to 14 or alkalinity assay kits of embodiments 14 to 29; (b) obtaining an analyte composition; (c) adding substantially the same volume of the analyte composition to each of the plurality of microwells of the microwell plate to form solutions from the analyte composition and the lyophilized titrate compositions in each of the plurality of microwells, wherein the pH of the solution in each microwell is different; and (d) measuring the absorbance value for each solution in each of the plurality of microwells at a first wavelength and a second wavelength and determining the alkalinity of the analyte composition based on the measured absorbance values. Embodiment 31 is the method of embodiment 30, wherein the pH of the solution in each microwell is sequentially lower. Embodiment 32 is the method of any one of embodiments 30 to 31, wherein the pH sensitive dye has an acid form and a base form, wherein the absorbance value of the acid form correlates to the first wavelength and the absorbance value of the base form correlates to the second wavelength. Embodiment 33 is the method of embodiment 32, wherein the pH sensitive dye is a triphenylmethane dye, bromocresol green, crystal violet, cresol red, thymol blue, 2,4-dintrophenol, bromopheol blue, methyl. Embodiment 34 is the method of embodiment 33, wherein pH sensitive dye is bromocresol green. Embodiment 35 is the method of any one of embodiments 30 to 34, wherein: (i) at least one of the solutions has absorbance values as measured at one or more wavelengths that are not statistically differentiable from the absorbance values of a solution with a pH value below that at which the dye shows a colorimetric response, which may be expressed as a ratio of the absorbance of multiple wavelengths, thereby indicating that said solution has an amount of acid that is greater than the amount required to neutralize the alkalinity of the analyte composition; and (ii) at least one of the solutions has absorbance values as measured at one or more wavelengths that are statistically differentiable from the absorbance values of a solution with a pH value above that at which the dye shows a colorimetric response, which may be expressed as a ratio of the absorbance of multiple wavelengths, thereby indicating that said solution has an amount of acid that is less than the amount required to neutralize the alkalinity of the analyte composition. Embodiment 36 is the method of any one of embodiments 30 to 34, wherein at least one of the solutions has an absorbance value at the second wavelength that is 0.4 to 1.7 times greater than absorbance value at the first wavelength, and wherein said at least one solution represents the alkalinity of the analyte composition +/−40 ppm. Embodiment 37 is the method of any one of embodiments 30 to 36, wherein the analyte in is an aqueous composition obtained from a subsurface well. Embodiment 38 is the method of any one of embodiments 30 to 36, wherein the analyte solution can include a plurality of solutions having the same analyte, and each analyte solution is obtained from a different well of a plurality of subsurface wells. Embodiment 39 is the method of embodiments 37 to 38, wherein the well is a hydrocarbon well or a water well in a subsurface hydrocarbon formation. Embodiment 40 is the method of any one of embodiments 30 to 39, wherein the analyte solution is obtained from a drilling process or fracking process. Embodiment 41 is the method of any one of embodiments 30 to 40, wherein the determined alkalinity value of the analyte correlates to a hardness of the water.

Embodiment 42 describes a method of making any one of the alkalinity assay kits of embodiments 14 to 29. The method can include (a) obtaining a microwell plate; (b) obtaining a lyophilized titrant composition comprising an acid, a pH sensitive dye, and an excipient; and (c) adding sequentially increasing amounts of the lyophilized titrant composition to a plurality of microwells of the microwell plate such that when an analyte composition is added to the lyophilized titrant composition in each microwell of the plurality of microwells a solution forms and the pH of the solution in each microwell is sequentially lower. Embodiment 43 is the method of embodiment 42, wherein obtaining a lyophilized titrant composition includes providing an aqueous solution of the titrant composition to one or more microwells of the microwell plate and subjecting the microwell plate to lyophilizing conditions sufficient to remove the water from the aqueous solution and form a powder. Embodiment 44 is the method of any one of embodiments 42 to 43, wherein the plurality of microwells are sealed to prevent the titrant composition from exiting the plurality of microwells. Embodiment 45 is the method of embodiment 44, wherein the plurality of microwells are sealed with a plastic film or a foil.

The term "acidic solution" refers to a solution that has a concentration of hydrogen ions greater than the concentration of hydroxide ion ([H+]>[OH−]).

The term "alkalinity" refers to the measurement of the ability of an aqueous solution to neutralize acidity. Alkalinity is usually expressed in ppm of calcium carbonate ($CaCO_3$).

The terms "basic solution" or "alkaline solution" refers to a solution that has a concentration of hydrogen ions less than the concentration of hydroxide ion ([H+]<[OH−]).

The term "pH" refers to the measurement of the concentration of hydrogen ions in water or other media. pH is generally expressed as a log scale based on 10 where pH=−log [H+].

The term "about" or "approximately" are defined as being close to as understood by one of ordinary skill in the art, and in one non-limiting embodiment the terms are defined to be within 10%, preferably within 5%, more preferably within 1%, and most preferably within 0.5%.

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the word "a" or "an" when used in conjunction with the term "comprising" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The alkalinity assay kits and the methods of using and making the alkalinity assay kits of the present invention can "comprise," "consist essentially of," or "consist of" particular ingredients, components, compositions, etc. disclosed throughout the specification. With respect to the transitional phase "consisting essentially of," in one non-limiting aspect, a basic and novel characteristic of the kits of the present invention is the ability to determine the alkalinity of an aqueous solution using spectrometric analysis.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description.

DETAILED DESCRIPTION OF THE INVENTION

Conventional technologies used to determine the alkalinity of a solution involve visual titration methods that are time-consuming and often inaccurate. Many time, manual visual titrations result in error resulting from the analyst overshooting the endpoint due to adding too much strong acid or misjudging the color change at the endpoint. A discovery has been made that avoids overshooting the endpoint and eliminating the need for a visual titration of adding an acidic solution drop wise into a water solution that includes the analyte. The discovery lies in the use of a lyophilized titrant sample used in a microwell plate. The titrant sample can include a pH sensitive dye, an acid, and an excipient. Each microwell of the microwell of the microwell plates has at least two microwells having a different pH. The analyte solution is added to the titrant to form a solution and the alkalinity of the solution is determined by measuring the absorbance value for each solution in each of the plurality of microwells at a first wavelength and a second wavelength and determining the alkalinity of the analyte composition based on the measured absorbance values.

These and other non-limiting aspects of the present invention are discussed in further detail in the following sections.

A. Alkalinity Assay Kit

Figure 1A:
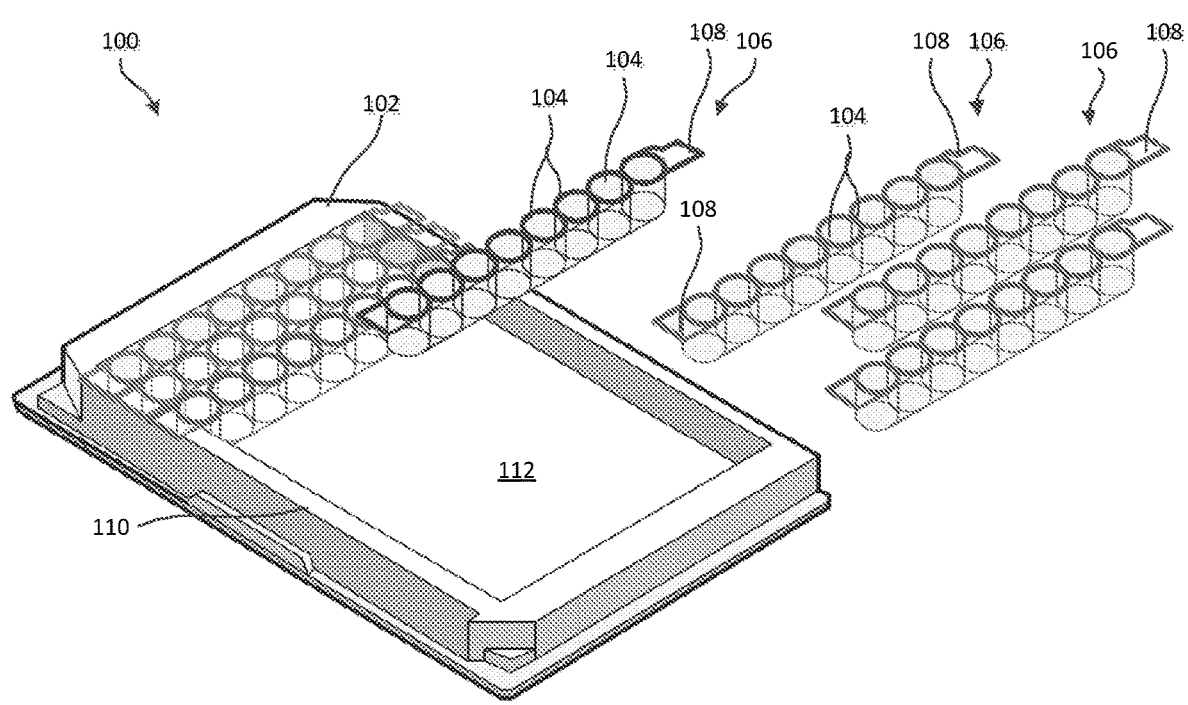
FIGS. 1A-1C are schematics of alkalinity assay kits of the present invention.
Figure 1B:
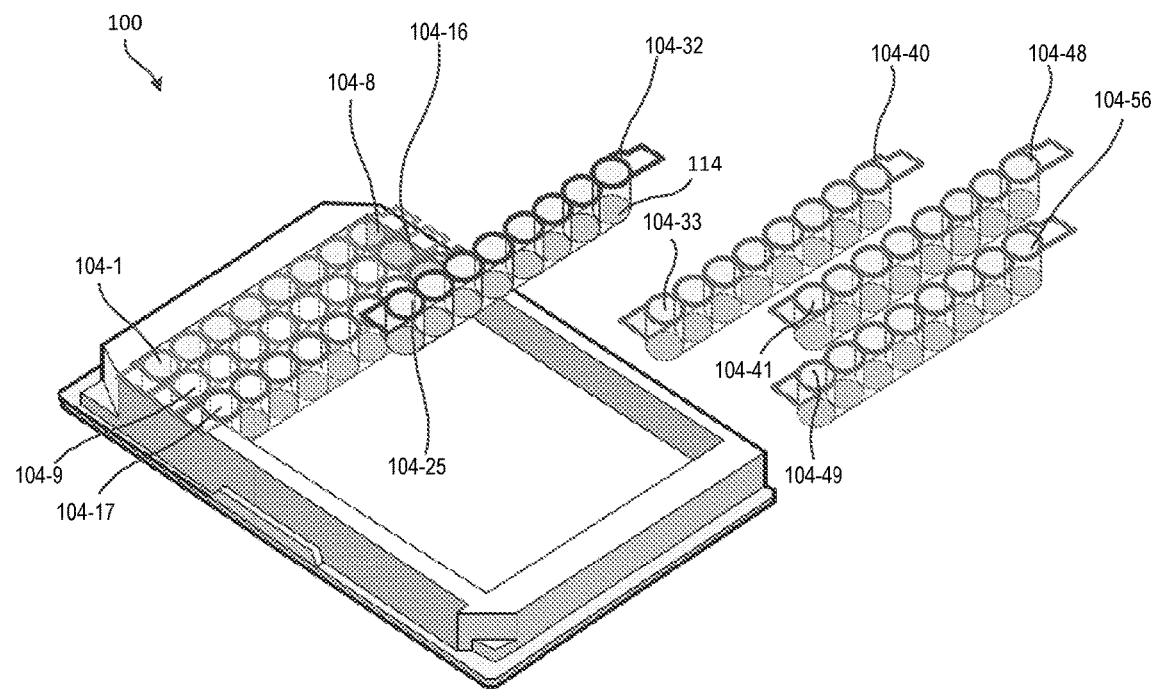
Figure 1C:
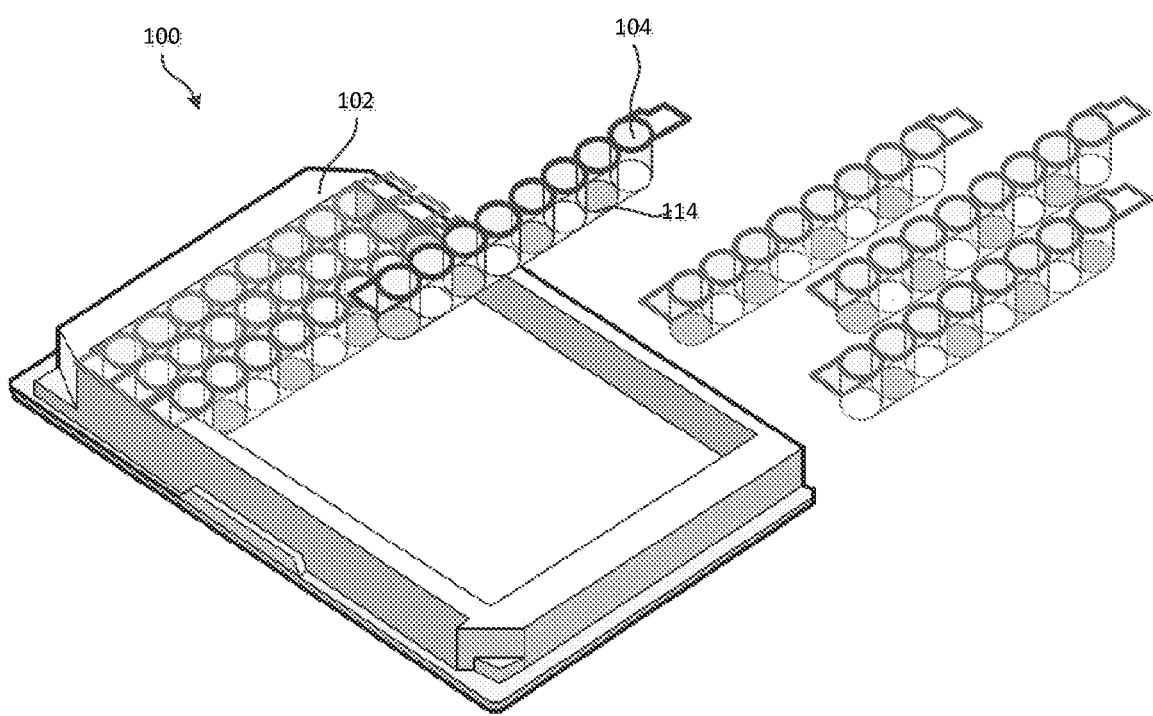

FIGS. 1A-1C depict schematics of embodiments of alkalinity assay system 100. The alkalinity assay system or kit includes microwell plate 102 having a plurality of microwells 104. The plurality of microwells 104 can be assembled in the removable holders 106. Holders 106 may include members 108 that position on top of the side wall 110. Holders 106 may rest on, or be suspended above, bottom wall 112 of the microwell plate 102. As shown, holder 106 includes eight (8) microwells 104, however, it should be understood that the number of microwells can be adjusted to the size of the microwell plate 102. For example, the number of the microwells 104 can be 2, 3, 4, 5, 6, 7, 8, 9, 10, 11, 12, 13, 14, 15, 16, 17, 18, 19, 20, etc. As shown in FIG. 1A, the microwell plate 102 does not include any titrant composition. FIG. 1B depicts all of the microwells having titrant composition 114 and FIG. 1C depicts some of the microwells having titrant composition 114. The microwells 104 can hold a volume of 20, 50, 300, 500 microliters, preferably 300 microliters or 400 microliters. The microwell plate 102, microwells 104, holders 106, can be made of any material having chemical resistance to acid. Non-limiting examples of materials include polymers, copolymers of polymers, polystyrene, polypropylene, cyclo-olefins and the like. The holders 106 may be polymeric or plastic tape with the microwells 104 embossed on the tape. Microwell plates are commercially available from Thermo Fisher Scientific (Waltham, Mass., USA).

As shown in FIG. 1B, the microwells 104 can be filled with sequentially increasing amounts of lyophilized titrant composition so that each microwell has an increasing amount of acid. In some embodiments, each microwell is can have an increasing amount of acid and then the other reagents can be added to the microwell. For example, microwell 104-1 can have the least amount of acid and microwell 104-56 can have the most amount of acid. In other embodiments, the microwells 104 in each holder 106 can have increasing amounts of acid, but each holder 106 have the same amount of acid. For example, microwells 104-1, 104-9, 104-17, 104-25, 104-33, 104-41, 104-49 can have the same amount of acid and microwells 104-8, 104-16, 104-32, 104-40, 104-48 and 104-56 can have the same amount of acid. It should be understood, that configuration of the amount titrant in the microwells 104 can be any chosen configuration as long as two of the microwells 104 have different amounts of acid. In some instances, the acid, dye and an excipient can be lyophilized in the microwells 104 in the microwell plate 102. Lyophilizing conditions include −60 degree Celsius at 100 mtorr. The microwells 104, microwell holders 106, and/or the microwell plate can be sealed with a known sealing agent (for example, plastic film or foil) to allow the microwell plate 102 or the microwell holders 106 to stored or transported. In some embodiments, the alkalinity assay system includes a spectrophotometer that is capable of measuring the absorbance of the chosen colorimetric dye.

B. Method of Determining Alkalinity of a Solution

Figure 2:
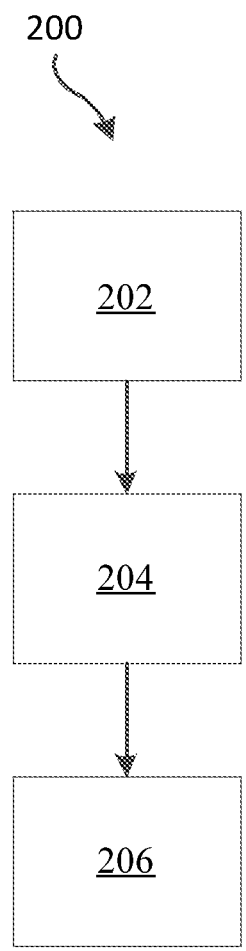
FIG. 2 is a flow chart depicting a method of determining alkalinity of a water body.

The alkalinity assay system and kit described throughout the specification can be used to determine the alkalinity of a solution. The solution can be a sample from a water body such as a subsurface water well in a hydrocarbon formation, a lake, a river, a canal or the like. Referring to FIG. 2, a flow chart for determining alkalinity is depicted. In method 200, the microwell plate 102 containing the lyophilized titrant composition 114 is obtained in step 202. In step 204, a known amount of analyte solution (for example 300 microliters) is added to the lyophilized titrant composition 114 reagents in the microwells 104 using a delivery apparatus (for example, multichannel pipette). In step 206, after solids in the plate have fully dissolved, the microwell plate 102 is placed in a spectrophotometer (for example, a plate reader) and the absorbance of each microwell at the wavelengths of the colorimetric dye is measured. In embodiments when the colorimetric dye is bromocresol green, the absorbances at 460 nm and 620 nm are measured. At least one of the solutions in a microwell 104 has absorbance values at the measured wavelengths that are not statistically differentiable from the absorbance values of a solution with a pH value below that at which the dye shows a colorimetric response. The absorbance value may be expressed as a ratio of the absorbance of multiple wavelengths, thereby indicating that said solution has an amount of acid that is greater than the amount required to neutralize the alkalinity of the analyte composition. At least one of the solutions has absorbance values as measured at one or more wavelengths that are statistically differentiable from the absorbance values of a solution with a pH value above that at which the dye shows a colorimetric response, which may be expressed as a ratio of the absorbance of multiple wavelengths, thereby indicating that said solution has an amount of acid that is less than the amount required to neutralize the alkalinity of the analyte composition. The absorbance data is then used to calculate the concentrations of the acidic and basic forms of the dye using their respective extinction coefficients. This data can be used to improve the accuracy of the system by allowing for the assessment of wells which have close to the exact amount of acid required to neutralize the sample. The alkalinity of the sample can then be determined based on that precise well rather than between two different wells. The ratios of the concentrations of the acid and base form of the dye used to calculate the alkalinity are limited only by the accuracy and precision of the detector used. It is often desirable to use the same values for the uncertainty in the single well case as is found for the two well case. The more narrow the window, the more precise the result will be. However, it will also be unlikely that a sample will fall into a smaller window. If one specific case uses an application with the wells spaced 80 ppm alkalinity apart so that the uncertainty in the two well case is +/−40 ppm, the ratios used to calculate the alkalinity for the single well case can be chosen such that the uncertainty is +/−40 ppm. Certain experimental conditions may require changes to the desired absorbance ratios in order to match the desired uncertainty window. In a non-limiting embodiment using bromocresol green as the dye, if the absorption at 460 nm is greater than 1.7 times the absorption at 620 nm, the microwell has more acid than is required to neutralize the alkalinity. If the absorption at 460 nm is less than 0.4 times the absorbance at 620 nm, the microwell does not have enough acid to neutralize the alkalinity. The first microwell which is found to have more acid than required represents the maximum value of the alkalinity. The last microwell which has less acid than required represents the minimum value of the alkalinity. The assessed alkalinity is thus the average alkalinity capacity of the two wells +/−half of their average alkalinity capacity. If a microwell displays an absorbance at 460 nm that is between 0.4 and 1.7 times the absorbance at 620, then the alkalinity is the value represented by that microwell +/−desired uncertainty window. For example, for the embodiment using bromocresol embodiment, setting the absorbance ratios between 0.4 and 1.7 created an uncertainty window of +/−40 ppm.

The system 100 can be automated to acquire data. The acquired data can be transmitted to one or more computer systems. The computer systems can include components such as CPUs or applications with an associated machine readable medium or article which may store an instruction or a set of instructions that, if executed by a machine, may cause the machine to perform a method and/or operations in accordance with the methods of the present invention. For example, the microwell plate 102 can be put in a plate reader and the spectrophotometer can automatically measure the absorbance of each sample. The measured absorbance can be stored in a computer system in the spectrophotometer and/or transmitted to another computer system. Either computer may be capable of processing the absorbance and displaying or printing an alkalinity value for a series of analytes. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The computer system may further include a display device such as monitor, an alphanumeric input device such as keyboard, and a directional input device such as mouse.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Alkalinity Assay Kit

Microwells (300 microliter) of a 96-microwell plate were filled with sequentially increasing amounts of acid to produce the pH listed in Table 1 upon the addition of the sample Bromocresol green (0.00028 mg, (Sigma-Aldrich®, USA) and (2-hydroxylpropyl)-β-cyclodextrin (0.01 mg,) was added to each well. The resulting aqueous titrant solution was lyophilized at −60° C. and 100 mtorr.

TABLE 1

| Microwell Number | pH |
| --- | --- |
| 1 | 4.199282922 |
| 2 | 2.796749476 |
| 3 | 2.504400165 |
| 4 | 2.331241458 |
| 5 | 2.207776457 |
| 6 | 2.111753092 |
| 7 | 2.033163951 |
| 8 | 1.966640589 |
| 9 | 1.908966484 |
| 10 | 1.858061333 |
| 11 | 1.812501841 |
| 12 | 1.771271221 |
| 13 | 1.733617761 |
| 14 | 1.698970004 |

Example 2

Determination of Alkalinity of a Water Body

Alkalinity Assay.

Analyte solutions (300 microliters) containing an unknown amount of carbonate ion was added to the microwells of the 96-microwell plate prepared in Example 1. After dissolution of the lyophilized titrant sample, the microwell plate was positioned in a plate reader and the absorbance value of the plate was determined.

The data shown in Table 2 was collected from a run of 3 produced waters on the alkalinity assay. The values in each set of 2 columns represent the 14 wells of a complete assay. The first row given is a blank. The ratios of the absorbances given by the rows "Blank 460" and "Blank 620" were used to calculate the alkalinity of each sample. This resulted in a calculation of 832+/−40, 543+/−40, and 294+/−40 ppm alkalinity for the 3 samples respectively.

TABLE 2

| 1 | 2 | 3 | 4 | 5 | 6 | |
| --- | --- | --- | --- | --- | --- | --- |
| 0.066 | 0.064 | 0.033 | 0.032 | 0.036 | 0.033 | 460 |
| 0.043 | 0.042 | 0.034 | 0.032 | 0.035 | 0.033 | 620 |
| 0.026 | 0.025 | −0.006 | −0.007 | −0.003 | −0.006 | Blank 460 |
| 0.008 | 0.007 | −0.001 | −0.003 | 0 | −0.002 | Blank 620 |
| 0.1 | 0.117 | 0.075 | 0.231 | 0.072 | 0.231 | 460 |
| 0.49 | 0.489 | 0.49 | 0.037 | 0.488 | 0.036 | 620 |
| 0.06 | 0.078 | 0.036 | 0.192 | 0.033 | 0.192 | Blank 460 |
| 0.455 | 0.454 | 0.455 | 0.002 | 0.453 | 0.001 | Blank 620 |
| 0.091 | 0.114 | 0.062 | 0.248 | 0.064 | 0.232 | 460 |
| 0.513 | 0.472 | 0.506 | 0.055 | 0.499 | 0.036 | 620 |
| 0.052 | 0.075 | 0.023 | 0.208 | 0.025 | 0.193 | Blank 460 |
| 0.478 | 0.437 | 0.471 | 0.02 | 0.464 | 0.001 | Blank 620 |

TABLE 2-continued

| 1 | 2 | 3 | 4 | 5 | 6 | |
| --- | --- | --- | --- | --- | --- | --- |
| 0.09 | 0.126 | 0.063 | 0.233 | 0.077 | 0.23 | 460 |
| 0.506 | 0.455 | 0.508 | 0.041 | 0.46 | 0.036 | 620 |
| 0.051 | 0.086 | 0.024 | 0.194 | 0.038 | 0.19 | Blank 460 |
| 0.471 | 0.42 | 0.473 | 0.006 | 0.425 | 0.001 | Blank 620 |
| 0.102 | 0.224 | 0.063 | 0.245 | 0.197 | 0.231 | 460 |
| 0.519 | 0.298 | 0.498 | 0.053 | 0.154 | 0.037 | 620 |
| 0.063 | 0.185 | 0.024 | 0.206 | 0.157 | 0.192 | Blank 460 |
| 0.484 | 0.263 | 0.463 | 0.018 | 0.119 | 0.002 | Blank 620 |
| 0.09 | 0.245 | 0.095 | 0.234 | 0.23 | 0.233 | 460 |
| 0.485 | 0.062 | 0.432 | 0.04 | 0.044 | 0.035 | 620 |
| 0.051 | 0.205 | 0.056 | 0.195 | 0.191 | 0.194 | Blank 460 |
| 0.45 | 0.027 | 0.397 | 0.005 | 0.009 | 0 | Blank 620 |
| 0.112 | 0.305 | 0.14 | 0.225 | 0.232 | 0.232 | 460 |
| 0.504 | 0.121 | 0.359 | 0.035 | 0.04 | 0.037 | 620 |
| 0.072 | 0.266 | 0.101 | 0.186 | 0.193 | 0.193 | Blank 460 |
| 0.469 | 0.086 | 0.324 | 0 | 0.005 | 0.002 | Blank 620 |
| 0.103 | 0.236 | 0.211 | 0.215 | 0.218 | 0.22 | 460 |
| 0.466 | 0.059 | 0.169 | 0.035 | 0.038 | 0.036 | 620 |
| 0.064 | 0.197 | 0.172 | 0.176 | 0.178 | 0.18 | Blank 460 |
| 0.43 | 0.024 | 0.134 | 0 | 0.003 | 0.001 | Blank 620 |

The invention claimed is:

1. A method of determining the alkalinity of an analyte composition, the method comprising:
   a) obtaining a microwell plate comprising at least six (6) microwells each having a sequentially increasing amount of a lyophilized titrant composition, wherein the lyophilized titrant composition is in powdered form and comprises an acid, a pH sensitive dye capable of having a colorimetric response in response to a change in pH of a solution, and an excipient;
   b) obtaining an aqueous liquid analyte composition;
   c) adding substantially the same volume of the aqueous liquid analyte composition to each of the at least six (6) microwells of the microwell plate to form solutions from the aqueous liquid analyte composition and each of the lyophilized titrate compositions in each of the at least six (6) microwells, wherein the pH of the solution in each microwell is different, and wherein each of the lyophilized titrate compositions are dissolved in each solution; and
   d) placing the microwell plate in a spectrophotometer and measuring the absorbance value for each solution in each of the plurality of microwells at a first wavelength and a second wavelength, wherein at least one of the solutions has an absorbance value at the second wavelength that is 0.4 to 1.7 times greater than absorbance value at the first wavelength, and wherein said at least one solution represents the alkalinity of the analyte composition +/−40 ppm.

2. The method of claim 1, wherein the pH of the solution in each microwell is sequentially lower.

3. The method of claim 1, wherein the pH sensitive dye has an acid form and a base form, wherein the absorbance value of the acid form correlates to the first wavelength and the absorbance value of the base form correlates to the second wavelength.

4. The method of claim 3, wherein the pH sensitive dye is a triphenylmethane dye, bromocresol green, crystal violet, cresol red, thymol blue, 2,4-dintrophenol, bromopheol blue, methyl.

5. The method of claim 4, wherein:
   (i) at least one of the solutions has absorbance values as measured at one or more wavelengths that are not statistically differentiable from the absorbance values of a solution with a pH value below that at which the dye shows a colorimetric response, which may be expressed as a ratio of the absorbance of multiple wavelengths, thereby indicating that said solution has an amount of acid that is greater than the amount required to neutralize the alkalinity of the analyte composition; and (ii) at least one of the solutions has absorbance values as measured at one or more wavelengths that are statistically differentiable from the absorbance values of a solution with a pH value above at which the dye shows a colorimetric response, which may be expressed as a ratio of the absorbance of multiple wavelengths, thereby indicating that said solution has an amount of acid that is less than the amount required to neutralize the alkalinity of the analyte composition.

6. The method of claim 1, wherein the analyte is an aqueous composition obtained from a subsurface well.

7. The method of claim 1, wherein the determined alkalinity value of the analyte correlates to a hardness of the water.

* * * * *